United States Patent
Schmidt et al.

(10) Patent No.: US 10,053,608 B2
(45) Date of Patent: Aug. 21, 2018

(54) METHOD TO FABRICATE HIGH TEMPERATURE COMPOSITE

(71) Applicant: United Technologies Corporation, Farmington, CT (US)

(72) Inventors: Wayde R. Schmidt, Pomfret Center, CT (US); Paul Sheedy, Bolton, CT (US); Neal Magdefrau, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/400,604

(22) Filed: Jan. 6, 2017

(65) Prior Publication Data

US 2018/0194981 A1    Jul. 12, 2018

(51) Int. Cl.
  C09K 5/14    (2006.01)
  C03C 10/00   (2006.01)

(52) U.S. Cl.
  CPC .............. C09K 5/14 (2013.01); C03C 10/00 (2013.01)

(58) Field of Classification Search
  CPC ............ C03C 2214/04; C03C 2214/08; C03C 2214/32; C03C 11/007; C03B 19/08; Y10T 428/25
  See application file for complete search history.

(56) References Cited

U.S. PATENT DOCUMENTS

| | | |
|---|---|---|
| 4,353,966 A | 10/1982 | Snitzer et al. |
| 4,358,512 A | 11/1982 | Richter |
| 4,397,961 A | 8/1983 | Snitzer et al. |
| 4,398,659 A | 8/1983 | Richter |
| 4,414,011 A | 11/1983 | Layden et al. |
| 4,581,053 A | 4/1986 | Prewo et al. |
| 4,786,304 A | 11/1988 | Chen |
| 4,902,326 A | 2/1990 | Jarmon |
| 4,909,872 A | 3/1990 | Jarmon |
| 4,921,518 A | 5/1990 | Allaire et al. |
| 4,949,921 A | 8/1990 | Jarmon et al. |
| 4,983,463 A | 1/1991 | Minford et al. |
| 5,118,560 A | 6/1992 | Tredway |
| 5,122,226 A | 6/1992 | Minford et al. |
| 5,192,475 A | 3/1993 | Tredway |
| 5,298,311 A * | 3/1994 | Bentson ............... C04B 35/806 428/212 |
| 5,422,055 A | 6/1995 | Yalvac et al. |
| 5,439,627 A | 8/1995 | De Jager |
| 5,552,215 A | 9/1996 | Tredway et al. |

(Continued)

OTHER PUBLICATIONS

Reutenauer et al. Synthesis and characterization of polyvinylsilazane as a precursor for Si3N4 based ceramic materials. J Mater Sci (2011) 46:6538-6544.*

(Continued)

*Primary Examiner* — Noah S Wiese

(74) *Attorney, Agent, or Firm* — Bachman & LaPointe, P.C.

(57) ABSTRACT

A method of fabricating a ceramic component includes processing a hybrid matrix blend formed of a ceramic precursor and a glass powder to form a hybrid matrix composite component. A polymer-derived ceramic component including a hybrid matrix composite formed of a hybrid matrix blend including at least one of a ceramic precursor and a conversion char, and a glass powder.

10 Claims, 2 Drawing Sheets

(56) References Cited

U.S. PATENT DOCUMENTS

| | | | |
|---|---|---|---|
| 5,569,422 | A | 10/1996 | Astier et al. |
| 6,407,339 | B1* | 6/2002 | Rice ................ H01B 7/292 |
| | | | 174/110 SR |
| 6,451,416 | B1 | 9/2002 | Holowczak et al. |
| 6,696,144 | B2 | 2/2004 | Holowczak et al. |
| 7,749,568 | B2 | 7/2010 | Schmidt |
| 8,105,967 | B1 | 1/2012 | Martin |
| 8,545,938 | B2 | 10/2013 | Schmidt et al. |
| 8,697,541 | B1* | 4/2014 | Kumar ............ H01L 21/02381 |
| | | | 257/103 |
| 8,900,661 | B2 | 12/2014 | Schmidt et al. |
| 2001/0036516 | A1 | 11/2001 | Schmidt |
| 2006/0147699 | A1* | 7/2006 | Sarkar .................. C03C 3/064 |
| | | | 428/323 |
| 2008/0020193 | A1 | 1/2008 | Jang et al. |
| 2008/0213498 | A1 | 9/2008 | Drzal et al. |
| 2009/0069169 | A1 | 3/2009 | Bauer |
| 2012/0028329 | A1* | 2/2012 | Scheffler ................ C03B 19/08 |
| | | | 435/183 |
| 2013/0224471 | A1 | 8/2013 | Sheedy et al. |
| 2016/0214907 | A1 | 7/2016 | Shim et al. |

OTHER PUBLICATIONS

Zocca et al. 3D-printed silicate porous bioceramics using a non-sacrificial preceramic polymer binder. Biofabrication 7 (2015) 025008.*

* cited by examiner

METHOD TO FABRICATE HIGH TEMPERATURE COMPOSITE

BACKGROUND

The present disclosure relates to composites and, more particularly, to a hybrid matrix therefor.

Glass matrix composites and polymer-derived ceramic matrix composites are suitable for high temperatures applications. Composite materials of these types are typically fabricated using techniques such as polymer infiltration and pyrolysis, melt infiltration, slurry infiltration, slip casting, tape casting, injection molding, glass transfer molding, dry pressing, isostatic pressing, hot isostatic pressing and others.

Glass matrix composites typically suffer from poor through thickness thermal conductivity due to the inherently low thermal conductivity of the matrix—this may be partially addressed by orienting thermally conductive fibers parallel to the heat flow path, however, the conductivity of the matrix and the overall composite may still be unsatisfactory for some applications.

SUMMARY

A method of fabricating a ceramic component according to one disclosed non-limiting embodiment of the present disclosure can include processing a hybrid matrix blend formed of a ceramic precursor and a glass powder to form a hybrid matrix composite component.

A further embodiment of the present disclosure may include, wherein processing the hybrid matrix blend includes at least one of radiation exposure, applied pressure and environmental exposure.

A further embodiment of the present disclosure may include, wherein the ceramic precursor includes an inorganic polymer.

A further embodiment of the present disclosure may include, wherein the ceramic precursor includes a hybrid organic/inorganic polymer or oligomer.

A further embodiment of the present disclosure may include, wherein the ceramic precursor includes an organically modified sol-gel.

A further embodiment of the present disclosure may include, wherein the ceramic precursor includes a silicon-containing precursor.

A further embodiment of the present disclosure may include, wherein the ceramic precursor includes one of silicon oxycarbide, silicon nitride and silicon carbide material.

A further embodiment of the present disclosure may include, wherein the glass powder includes at least one of an aluminosilicate, a boron-containing glass and a phosphorus-containing glass.

A further embodiment of the present disclosure may include, wherein the glass powder includes at least one of lithium aluminosilicate (LAS), barium magnesium aluminosilicate (BMAS), calcium magnesium aluminosilicate (CMAS), strontium aluminosilicate (SAS).

A further embodiment of the present disclosure may include, wherein the hybrid matrix blend is prepared as a mixed powder.

A further embodiment of the present disclosure may include, wherein the mixed powder follows pyrolysis of the ceramic precursor.

A further embodiment of the present disclosure may include, wherein the mixed powder is co-mixed and co-fired to distribute the phases.

A further embodiment of the present disclosure may include, wherein the hybrid matrix composite component includes a glass phase and a polymer-derived ceramic phase.

A further embodiment of the present disclosure may include, wherein the hybrid matrix blend includes barium magnesium aluminosilicate (BMAS) glass powder that is co-pyrolyzed with a silicon oxycarbide.

A further embodiment of the present disclosure may include, wherein the ceramic precursor is a conversion char following processing.

A further embodiment of the present disclosure may include, wherein the conversion char is a solid containing one or more ceramic phases which are amorphous, crystalline or semi-crystalline.

A further embodiment of the present disclosure may include, wherein the ceramic component includes a material processed through at least one of sol-gel, high temperature reaction synthesis, sublimation, and combustion synthesis.

A polymer-derived ceramic component according to one disclosed non-limiting embodiment of the present disclosure can include a hybrid matrix composite formed of a hybrid matrix blend including a ceramic precursor and a glass powder.

A further embodiment of the present disclosure may include, wherein the thermal conductivity of the hybrid matrix composite is between about 6-20 W/mk.

A further embodiment of the present disclosure may include, wherein the ceramic precursor includes at least one of an organic polymer, inorganic polymer, a hybrid organic/inorganic polymer, an organically modified sol-gel, an oligomer and the glass powder includes at least one of an aluminosilicate, a boron-containing glass and a phosphorus-containing glass.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
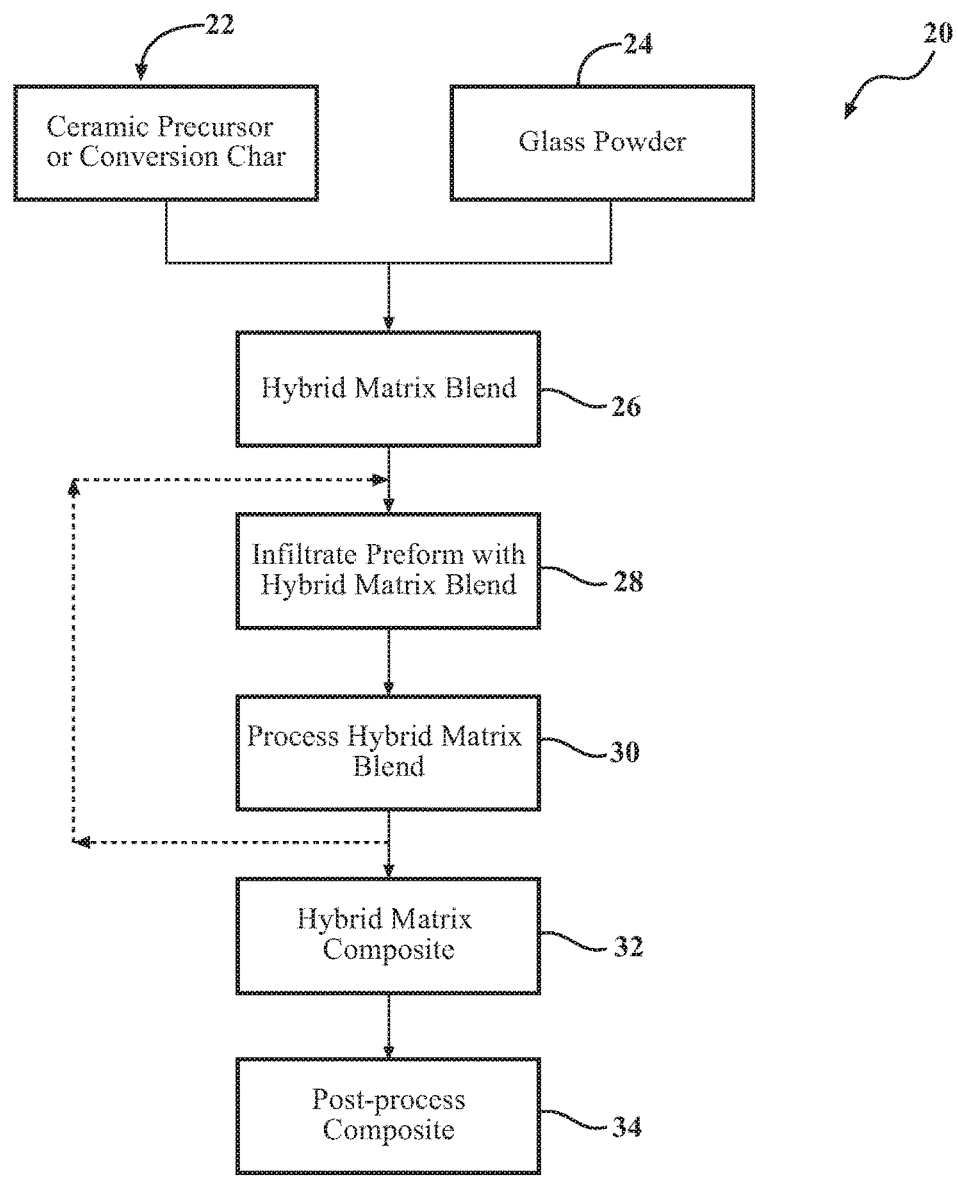
FIG. 1 illustrates an example method for processing a hybrid matrix component.

FIG. 1 illustrates a method 20 for processing a hybrid matrix composite component. The method can be used to produce compositions and/or microstructures for the enhancement of densification, thermal conductivity or other target property in components such as cooled or uncooled turbine engine components.

Initially, a ceramic precursor or precursor-derived conversion char (step 22) is incorporated with a glass powder (step 24) to form a hybrid matrix blend (step 26). The precursor-derived char can be, for example, a polymer-derived silicon oxycarbide or silicon carbide material, both of which have significantly improved thermal conductivity over typical oxide glasses. The ceramic precursor can alternately include solid or liquid forms of an inorganic polymer resin, a hybrid organic/inorganic polymer or oligomer, an organically modified sol-gel, or a combination thereof. The ceramic precursor can further contain fillers. The glass powder, such as an aluminosilicate, which has relatively poor thermal conductivity, can be selected based on the thermal and environmental conditions of the application to include but not be limited to lithium aluminosilicate (LAS), barium magnesium aluminosilicate (BMAS), calcium magnesium aluminosilicate (CMAS), strontium aluminosilicate (SAS), etc.

The ceramic precursor, the conversion char and the glass powder can be prepared as a mixed powder, following pyrolysis of the ceramic precursor, or can be blended or co-mixed and co-fired to distribute the phases. The resulting hybrid matrix blend includes at least one glass phase and the precursor- or polymer-derived ceramic phase that will have an inherently greater thermal conductivity than that of the glass phase(s) alone. Example systems include a BMAS glass powder that is blended with, and co-pyrolyzed with a silicon-containing precursor. Representative examples are silicon oxycarbide, a silicon nitride precursor or a silicon carbide precursor.

Figure 2:
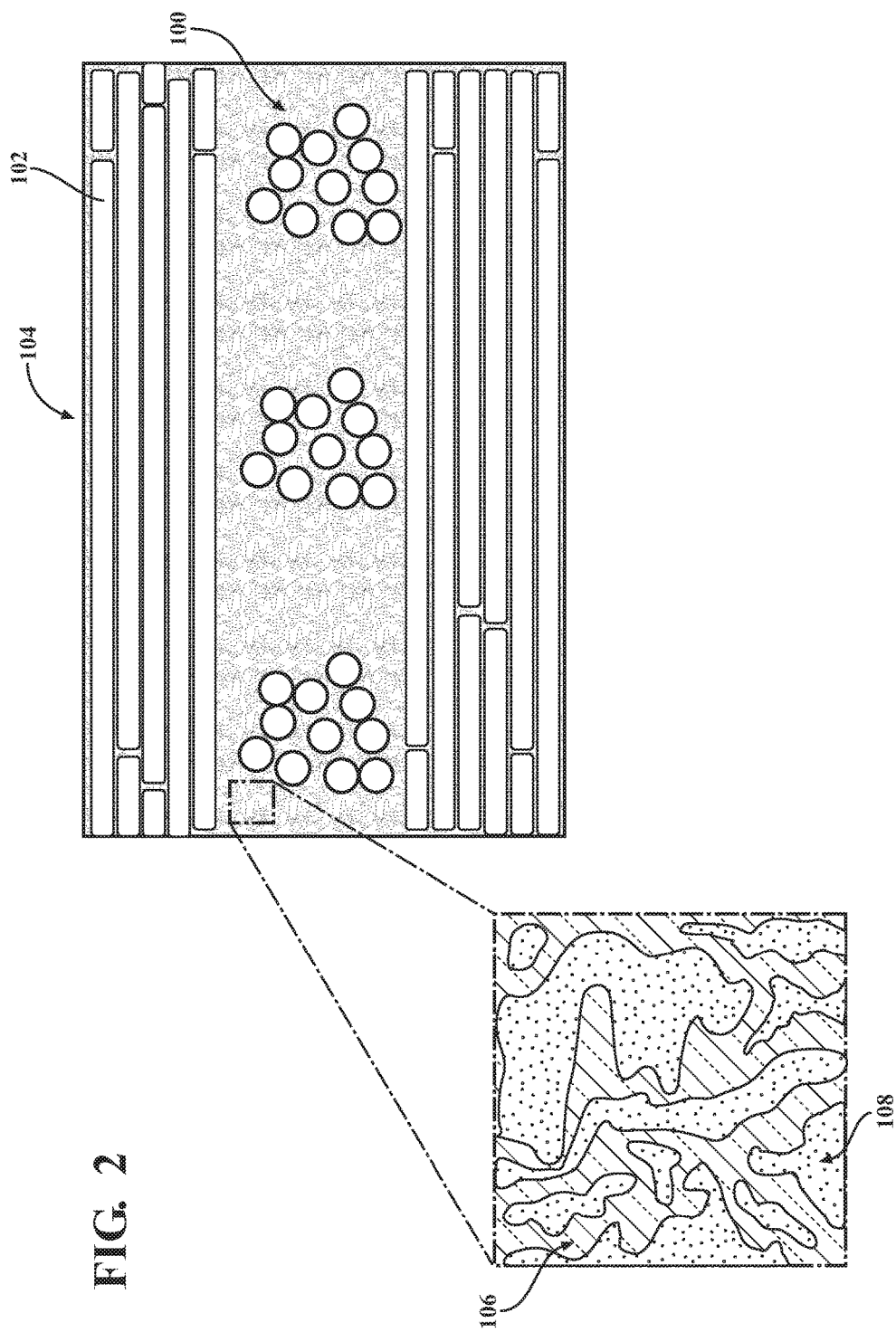
FIG. 2 illustrates an exemplary hybrid matrix component structure.

The resulting hybrid matrix blend is then subsequently used to prepare a composite material (step 28). For example, if the precursor is liquid, then the hybrid matrix blend material may be utilized to infiltrate a reinforcement preform prepared by vacuum infiltration, dipping, etc. If the precursor is a solid conversion char, then a suitable liquid may be used as a dispersant/delivery medium to produce a slurry used for vacuum infiltration, dipping, etc. of the preform. The residual carrier liquid is then removed via sublimation, drying, vacuum, heating, etc. or a combination of methods. That is, the hybrid matrix blend material (FIG. 2; 100) may be utilized with for example, tape layups, cloth layups, unidirectional fiber tows, nonwoven fabrics and/or 3-D woven reinforced structures (FIG. 2; 102) to form an infiltrated preform (FIG. 2; 104).

The infiltrated preform is then processed (step 30) via, for example, radiation exposure such as thermal, microwave, plasma treatment, visible or ultraviolet light, etc., or environmental exposure such as air, ozone, atmospheric, moisture, etc. Additional processing methods may include application of external pressure via hot pressing, isostatic pressing, molding, autoclaving with vacuum bagging, or combinations thereof to form a hybrid matrix composite component (step 32).

The hybrid matrix blend material (FIG. 2; 100) is a conversion char that is a solid containing one or more glass phases (FIG. 2; 106) and one or more ceramic phases (FIG. 2; 108), which may be amorphous, crystalline or semi-crystalline. In one non-limiting example, pellets have been pressed from a mixture of powders of each material and fired to temperatures up to approximately 1500° C. in air. The resulting pellets are black in color, have both glass and ceramic phases and exhibit higher thermal conductivity than the glass matrix alone.

In another non-limiting embodiment, a preceramic polymer resin may be used as the flowable (liquid or meltable solid) carrier for tape/slurry processes, but filled with glass so that the polymer serves as a binder in the green infiltration process, then, when processed via pyrolysis under controlled conditions, is converted to at least one high conductivity, continuous filler phase in the glass. Upon application of additional heat and/or pressure, the glass component of the hybrid matrix flows and further densifies the composite, also potentially enabling crystallization of any amorphous, polymer-derived ceramic char. In one example, the polymer-derived ceramic char may induce crystallization of at least one glass phase to produce a glass-ceramic phase. In one example, the thermal conductivity of the hybrid matrix is between about 6-20 Watts per meter-Kelvin (W/mK). For comparison, the thermal conductivity of the original glass phase only is between about 2-5 Watts per meter-Kelvin (W/mK).

Finally, the composite may be machined or otherwise processed to final dimensions and desired properties (step 34).

The ceramic precursor, conversion char, polymer precursor or polymer-derived ceramics are compatible with high temperature ceramic matrix composites, hybrid matrices, polymer infiltration and pyrolysis (PIP) processes, and glass-ceramic matrix composites. The composite provides a relatively higher matrix thermal conductivity and is amenable to multiple processing methods. Direct chemical interaction occurs between polymer-derived ceramic phases (especially oxide bond containing) and oxide glass phases. The combination of glass and polymer-derived ceramic or conversion char can also be used to increase refractoriness to the matrix. In one example, B-containing species (borosilicate glass, $B_4C$, $B_6Si$, etc.) appear to destabilize the polymer-derived silicon oxycarbide (SiOC) structure such that the oxycarbide may devitrify into silicon carbide (SiC) and silica ($SiO_2$), which will provide additional refractoriness to the glass.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A method of fabricating a ceramic component, comprising:

processing a hybrid matrix blend formed of at least one of a ceramic precursor and conversion char, and a glass powder comprising at least one of lithium aluminosilicate (LAS), barium magnesium aluminosilicate (BMAS), calcium magnesium aluminosilicate (CMAS), and strontium aluminosilicate (SAS) to form a hybrid matrix composite component comprising a glass phase and a polymer-derived ceramic phase, the hybrid matrix composite component having a greater thermal conductivity than that of the glass phase alone, wherein the thermal conductivity of the hybrid matrix composite is between about 6-20 Watts per meter-Kelvin (W/mk), wherein the ceramic precursor includes a hybrid organic/inorganic polymer or oligomer.

2. The method as recited in claim 1, wherein processing the hybrid matrix blend includes at least one of radiation exposure, applied pressure and environmental exposure.

3. The method as recited in claim 1, wherein the ceramic precursor includes an inorganic polymer.

4. The method as recited in claim 1, wherein the ceramic precursor includes a silicon-containing precursor.

5. The method as recited in claim 1, wherein the glass powder includes at least one of an aluminosilicate, a boron-containing glass and a phosphorus-containing glass.

6. The method as recited in claim 1, wherein the hybrid matrix blend is prepared as a mixed powder.

7. The method as recited in claim 6, wherein the mixed powder follows pyrolysis of the ceramic precursor.

8. The method as recited in claim 6, wherein the mixed powder is co-mixed and co-fired to distribute the phases.

9. A method of fabricating a ceramic component, comprising:

processing a hybrid matrix blend formed of at least one of a ceramic precursor and conversion char, and a glass powder comprising at least one of lithium aluminosilicate (LAS), barium magnesium aluminosilicate (BMAS), calcium magnesium aluminosilicate (CMAS), and strontium aluminosilicate (SAS) to form a hybrid matrix composite component comprising a glass phase and a polymer-derived ceramic phase, the hybrid matrix composite component having a greater thermal conductivity than that of the glass phase alone, wherein the thermal conductivity of the hybrid matrix composite is between about 6-20 Watts per meter-Kelvin (W/mk), wherein the ceramic precursor includes an organically modified sol-gel.

10. A method of fabricating a ceramic component, comprising:

processing a hybrid matrix blend formed of at least one of a ceramic precursor and conversion char, and a glass powder comprising at least one of lithium aluminosilicate (LAS), barium magnesium aluminosilicate (BMAS), calcium magnesium aluminosilicate (CMAS), and strontium aluminosilicate (SAS) to form a hybrid matrix composite component comprising a glass phase and a polymer-derived ceramic phase, the hybrid matrix composite component having a greater thermal conductivity than that of the glass phase alone, wherein the thermal conductivity of the hybrid matrix composite is between about 6-20 Watts per meter-Kelvin (W/mk), wherein the ceramic component includes a material processed through at least one of sol-gel, high temperature reaction synthesis, sublimation, and combustion synthesis.

* * * * *